Aug. 2, 1960    P. HERMAN    2,947,127
PACKAGE WRAPPING MACHINE
Filed March 26, 1959    2 Sheets-Sheet 1
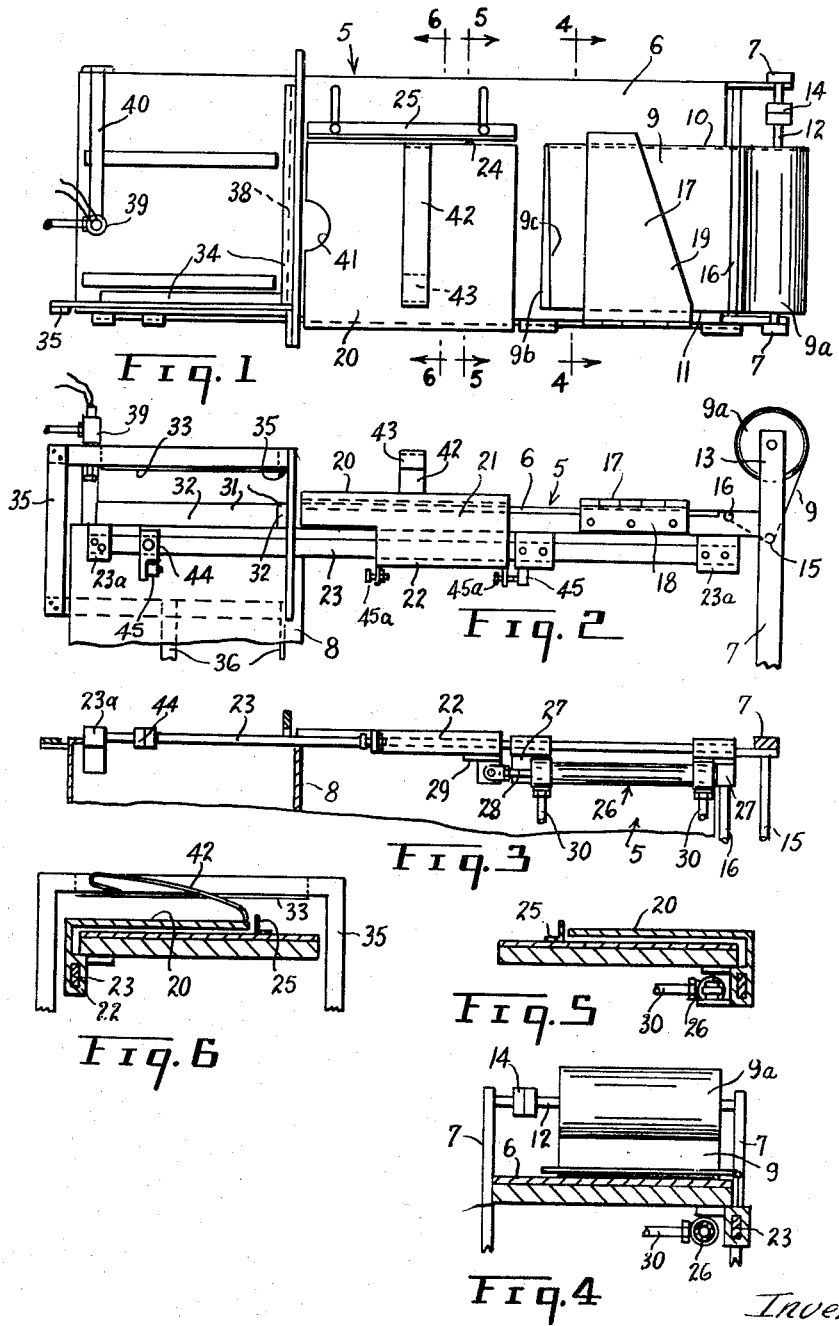
Inventor
PHILIP HERMAN
By Fetherstonhaugh & Co.
Attorneys Aug. 2, 1960 P. HERMAN 2,947,127
PACKAGE WRAPPING MACHINE
Filed March 26, 1959 2 Sheets-Sheet 2
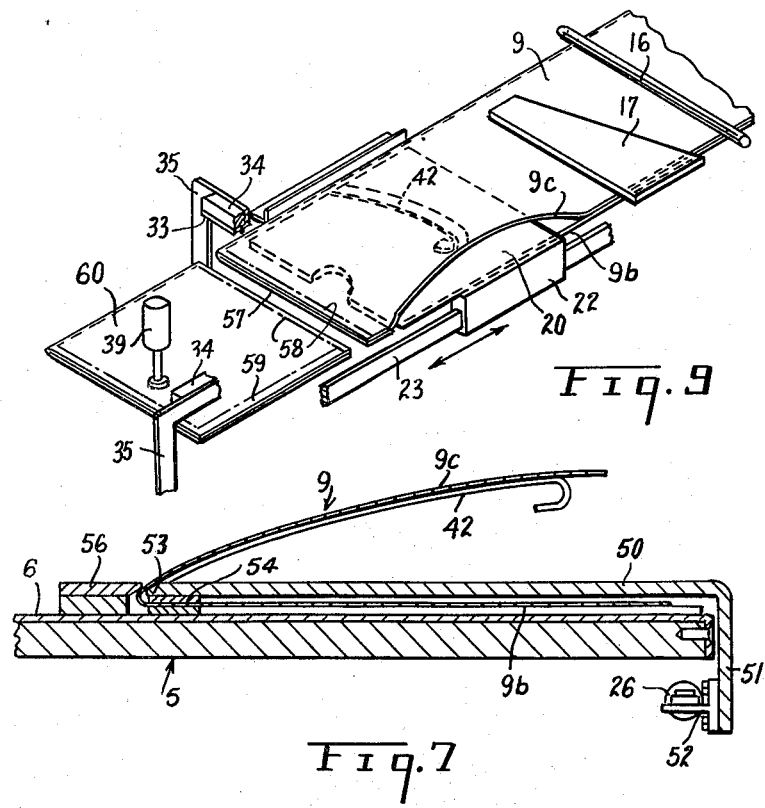
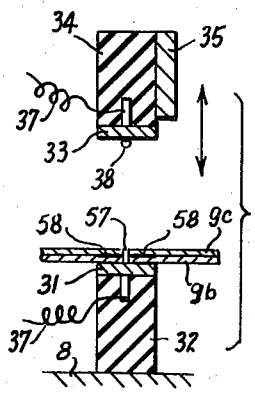
Inventor
PHILIP HERMAN
By Featherstonhaugh & Co
Attorneys United States Patent Office 2,947,127
Patented Aug. 2, 1960

2,947,127

PACKAGE WRAPPING MACHINE

Philip Herman, Montreal, Quebec, Canada, assignor to Herman & Leal Ltd., Montreal, Quebec, Canada Filed Mar. 26, 1959, Ser. No. 802,227

13 Claims. (Cl. 53—182)

This invention relates to package wrapping machines and particularly to machines using a slit tube or longitudinally folded sheet of plastic material such as polyethylene as the wrapping material with means to advance the wrapping material and the article to be wrapped into a sealing position where the package is heat sealed and separated from the wrapping material.

The invention consists essentially in a machine having means for advancing a wrapping material such as a slit tube or lengthwise folded sheet of plastic, such as polyethylene through a wrapping machine, first under a stabilizing plate and then separating the lower and upper layers of the folded material by an article carrying plate. The machine is provided with heat sealing elements and a material severing element, with means to reciprocate the article carrying plate longitudinally of the machine from the article receiving station to the heat sealing and severing station, with the heat sealing and severing elements being synchronized with the reciprocating movement of the article carrying plate so that the heat sealing and severing operations take place only after the carrying plate has advanced the wrapping material and the article to be wrapped into the sealing and severing stations and the carrying plate is subsequently withdrawn to the article receiving station of the machine.

The object of the invention is to provide an automatic article wrapping machine in which a continuous length of plastic wrapping material is advanced in the machine first to an article receiving station and thence to a package sealing and severing station.

A further object of the invention is to provide a simple automatic article wrapping machine which requires no handling of the wrapping material by the operator of the machine.

A further object of the invention is to provide for advancing pliable plastic wrapping material in the form of a folded sheet without wrinkling through the stages of forming an article container, filling the container and sealing and severing the filled container from the folded sheet.

A further object of the invention is to provide a wrapping machine using a continuous sheet of folded plastic material which can be adapted to wrap and seal articles of varies sizes and shapes.

These and other objects will be apparent from the following specification and the accompanying drawings, in which:

Figure 1 is a plan view of the machine showing the wrapping material partly advanced in the machine.

Figure 2 is a partial side elevation of the machine.

Figure 3 is a partial plan view looking on the underside of machine and showing the carrier plate advancing mechanism.

Figure 4 is a vertical cross section on the line 4—4 of Figure 1 showing the stabilizing plate resting on the folded wrapping material as it comes off the roll.

Figure 5 is a vertical cross section on the line 5—5 of Figure 1 through the carrier plate and looking towards the incoming side of the machine.

Figure 6 is a vertical cross section on the line 6—6 of Figure 1 looking towards the output side of the machine.

Figure 7 is an enlarged horizontal cross section similar to Figure 5 but showing a modified form of carrier plate.

Figure 8 is an enlarged sectional view showing one method of sealing the package and cutting the package off from the package forming material.

Figure 9 is a perspective view in diagrammatic form of the method of handling the packaging material through the machine.

Referring to the drawings, Figures 1 to 6 show, in detail, a preferred form of the package wrapping machine. The package wrapping machine consists of a series of elements mounted on a table 5 which is surfaced with a smooth metal plate 6 such as of stainless steel, and is supported on suitable legs 7 and a power control cabinet 8.

The package wrapping material 9 is preferably a tube of polyethylene slit lengthwise or a sheet of polyethylene folded on itself lengthwise and supplied to the wrapping machine in the form of a roll 9a with the folded edge 10 of the material being located at the back of the machine and the open edges 11 at the front of the machine. The roll of wrapping material 9 is mounted on the shaft 12 supported between upward extensions 13 of the legs 7. The shaft 12 is preferably provided with a variable tensioning device 14 whereby the wrapping material will be pulled off the roll 9 under a predetermined tension.

The folded wrapping material 9 is drawn off the roll 9a and passed around the rolls 15 and 16 and thence on to the flat surface 6 of the table 5 and is then passed under the stabilizing plate 17. This stabilizing plate 17 is preferably hinged at 18 to the front edge of the table 5 and its whole under surface rests freely on the top surface of the folded wrapping material 9. The edge 19 of the plate 17 adjacent the roll of material 9 is preferably angled in the manner shown in Figure 1, in order to reduce to a minimum any tendency for the edge 19 of the plate to lift or wrinkle the top layer of the folded material 9.

A carrier plate 20 is mounted over and slightly clear of the top surface 6 of the table and is adapted to be reciprocated horizontally along the machine. The carrier plate 20 is offset downwardly at 21 to form a bearing member 22 slidably mounted on the guide bar 23 mounted in brackets 23a on the under side of the table 5. The guide bar 23 is preferably of rectangular section and is sufficiently rigid and the length of the bearing member 22 is sufficiently long that combined they will hold the carrier plate 20 against any tendency for it to twist in a horizontal plane. Also the carrier plate 20 is sufficiently rigid that it will maintain an even clearance above the top surface 6 of the table 5.

The folded wrapping material 9 is drawn towards the carrier plate 20 and its under layer 9b is passed under the carrier plate 20 and its upper layer 9c is passed over the carrier plate 20, with the folded edge 10 of the material enveloping the edge 24 of the carrier plate. A backing angle 25 is adjustably mounted on the table 5 and is brought into sufficiently close contact with the folded edge 10 of the wrapping material as to hold the wrapping material against wrinkling along the edge 24 of the carrier plate 20 but clear enough to allow the wrapping material to be pulled freely along the machine and for the carrier plate to be reciprocated between the lower and upper layers 9b and 9c as will be described later.

The carrier plate 20 is reciprocated along the top surface 6 of the machine by means of the piston and cylinder device 26, the cylinder of which is secured, by means of the brackets 27, to the table 5. The piston 28 of the piston and cylinder device 26 is attached through the bracket 29 to the bearing member 22 of the carrier plate 20. Fluid pressure pipes 30 supply fluid to the cylinder of the piston and cylinder device 26 to effect reciprocating motion to the carrier plate 20.

The sealing and cutting means are located over the control cabinet 8 and consist of stationary and movable hot or impulse sealing bars in the form of a right angle with one member of the right angle being located transversely of the table 5 and the other member being located along the front edge of the table. The stationary sealing bars 31 are two in number and are mounted on the top face of the insulating bars 32 which in turn are mounted on the top surface of the cabinet 8. The movable sealing bars 33 are mounted on the under face of the insulating bars 34 which in turn are mounted on the framework 35 which is reciprocated up and down by means of suitable mechanism located within the cabinet 8. The reciprocating mechanism operating the frame 35 is not shown but may operate through the bars 36. The sealing bars 31 and 33 are connected by the wires 37 to a source of heat producing current, not shown.

A cutting wire 38 is stretched along the under side of sealing bar 33 on the member which is located transversely of the machine.

A solenoid operated clamping device 39 is mounted on the bracket 40 and is located in line lengthwise of the machine with the cut-out portion 41 of the carrier plate 20. The position of the clamping device 39 can be adjusted lengthwise of the machine to suit various sizes of wrapped packages as will be explained in a description of the operation of the machine.

Where bulky articles are to be wrapped with the wrapping material 9, a curved bracket 42 is mounted on the rear edge 24 of the carrier plate 20 and extends forwardly towards the front of the machine. The forward end of the bracket 42 is curved under and backwards at 43 and at a height above the top surface of the carrier plate 20 which will hold the front edge of the upper layer 9c of the material 9 at a height above the carrier plate to conveniently allow insertion of the article to be wrapped on to the surface of the carrier plate and under the upper layer 9c of the wrapping material.

The travel of the carrier plate 20 on its guide bar 23 is limited in one direction by the fixed bracket 23a and in the other direction by the adjustable bracket 44 which is slidable on the guide bar 23. Limit switches 45 operated by the adjustable contact pins 45a on the carrier plate 20 control the opening and closing of valves, not shown, feeding fluid to and from the piston and cylinder device 26 to effect movement of the carrier plate 20.

In Figures 1 to 6 the carrier plate 20 is shown as being sufficiently rigid as to require no support at its rear edge 24. In Figure 7 a modified form of carrier plate is shown in which the carrier plate 50 is in sheet form bent over at its front edge 51. A bracket 52 forms a connection link between the carrier plate 50 and the piston and cylinder device 26. The rear edge 53 of the carrier plate 50 is provided on its under side with a strip of bearing material 54 while a similar strip of bearing material 55 is mounted directly under the top surface of the metal plate 6. The strips of bearing material 54 and 55 are preferably of a smooth, hard wearing material which will allow for smooth passage of the under layer 9c of the wrapping material between them. A keeper plate 56, prevents riding up of the carrier plate 50 and also provides a guide or backing plate which holds the wrapping material 9 from wrinkling along the edge 33 of the carrier plate.

In some forms of wrapping machines where the article to be wrapped is simple and small the carrier plate may be a fixture on the table 5 in much the same form as the stabilizing plate 17.

In the operation of the above described wrapping machine. The article to be wrapped will determine the width of the roll of wrapping material 9 to be used and the size of the carrier plate 20. It is here to be understood that the machine will accommodate a wide selection of both rolls of wrapping material and carrier plates for the wrapping of very small articles to such as books and records to bulky articles such as sweaters, shirts and blankets. After the roll of wrapping material and the required size of carrier plate with or without the bracket 42, have been mounted on the machine, the longitudinal position of the carrier plate 20, the adjustable brackets 44 and limit switches 45 and the clamping device 39 are adjusted relative to each other to suit the size of the wrapped package.

The wrapping material 9 is then drawn off its roll and passed about the rolls 15 and 16 and under the stabilizing plate. The lower and upper layers 9b and 9c of the wrapping material are then separated with the lower layer 9b being passed under the carrier plate 20 and the upper layer being passed over the carrier plate. The backing angle 25 is now adjusted against the wrapping material along the edge 24 of the carrier plate 20 to hold the material against wrinkling on the edge of the carrier plate. The wrapping material is drawn further along the machine to beyond the transverse portions of the sealing bars 31 and 33. The framework 35 carrying the upper sealing bars 33 is then lowered so as to pinch the ends of the lower and upper layers 9b and 9c of the wrapping material together and seal them by heat and pressure. At the same time the cutting wire 38 cuts the sealed material along a line 57 midway of the width of the seal 58 as shown in Figures 8 and 9.

With the transverse end of the wrapping material sealed at 58, the article to be wrapped is now inserted between the carrier plate 20 and the upper layer 9c. As will be seen particularly in Figure 9, the bracket 42 provides a convenient means of raising the upper layer 9c of the material to enable bulky articles to be inserted on the carrier plate without having to lift the sheet by hand. For flat articles such as records, etc. it has been found that the bracket 42 can be dispensed with. The carrier plate 20 is now moved to the left against the sealed edge 57 of the wrapping material. This has the effect of drawing the wrapping material with it. Movement to the left is continued until the entire package is within the area of the right angled sealing bars 31 and 33 over the cabinet 8. When the carrier plate 20 is moved to its extreme left hand position, the clamp 39 is lowered. This holds the package and its contents firmly to the top of the cabinet 8 while the carrier plate 20 is withdrawn to the right. After the carrier plate 20 has been withdrawn, the framework 35 is then lowered and the package is sealed lengthwise along its front edge as at 59 in Figure 9 and transversely at 58 in the same manner as before but at the right hand end of the package. At the same time the wire 38 cuts the seal 57 in two to separate the sealed package 60 from the wrapping material 9. The clamp 39 is then released and the package can either be lifted off the machine by hand or it can be pushed off by the next formed package.

With the use of the above described wrapping machine, packages of various size, shape and form can be wrapped and sealed in a minimum of time and without waste of the wrapping material. The machine is capable of a wide variety of adjustments to suit various size packages and all controls can be made to function automatically. Such controls as the feeding of fluid to the piston and cylinder device, the operation of the frame 35 carrying the sealing bars 33 and the hot wire 38, and the operation of the clamp 39 can be of any well known type in general use and it has not been thought necessary to describe these in detail. Generally all such controls would be contained in the cabinet 8 with any control buttons etc. being available from the outside.

What I claim is:

1. A package wrapping machine in which the package wrapping material is in the form of a rolled continuous sheet folded upon itself lengthwise of the machine and mounted at one end of the machine for feeding of the material lengthwise therethrough, the said machine comprising a table, an article carrying plate reciprocatingly mounted for longitudinal movement over said table and projected transversely between the lower and upper layers of the folded wrapping material, a pair of right angled heat sealing members located transversely and longitudinally of the machine and one above the other, means to bring the sealing members into sealing engagement with the said wrapping material firstly to seal the wrapping material transversely to form a transverse closed end, the said article carrying plate in its forward longitudinal movement contacting the transverse sealed end of the material to feed the wrapping material along the machine, means to hold the said wrapping material and the article being carried by the carrying plate while the carrying plate is withdrawn, means to bring the sealing members into sealing engagement with the wrapping material to secondly seal the material transversely remote from the first transverse seal and longitudinally along the edges of the material between the first and second transverse seals and means to sever the second transverse seal midway of its width to separate the sealed package from the wrapping material and leave the end of the wrapping material sealed for a second operation.

2. In a package wrapping machine as set forth in claim 1, in which adjusting means is associated with said carrier plate to adjustably locate the said carrier plate longitudinally on said table.

3. In a package wrapping machine as set forth in claim 1, in which reciprocating means including a piston and cylinder device reciprocates the said carrier plate longitudinally over the said table.

4. In a package wrapping machine as set forth in claim 1, in which a stabilizing plate rests upon the forward travelling wrapping material and is located over the said table between the rolled wrapping material and the said carrier plate.

5. In a package wrapping machine as set forth in claim 4, in which the stabilizing plate is hinged to the front longitudinal edge of the machine table and has its edge adjacent the roll of wrapping material tapered backwards towards the folded edge of the wrapping material and away from the roll of wrapping material.

6. In a package wrapping machine as set forth in claim 1, in which a tension device applies a hold back tension to the feed out of the roll of wrapping material.

7. In a package wrapping machine as set forth in claim 1, in which the carrying plate is provided with a cutout portion to permit the holding means to hold the wrapping material and the article being carried while the carrying plate is withdrawn.

8. In a package wrapping machine as set forth in claim 1, in which a guide is mounted on said table, the said guide holding the folded edge of the wrapping material smooth against the adjacent edge of the carrying plate.

9. In a package wrapping machine as set forth in claim 1, in which a bracket is mounted on the carrying plate, the said bracket holding the longitudinal edge of the upper layer of the wrapping material away from the upper surface of the carrying plate to provide an article inserting opening.

10. In a package wrapping machine as set forth in claim 1, in which the heat sealing means include a pair of right angle members located in horizontal planes one above the other and connected to a source of electric current, and a cutting wire is stretched lengthwise on the under side of the transverse portion of the upper member midway of the width of the member.

11. In a package wrapping machine as set forth in claim 10, in which the transverse portions of the heat sealing members are located close to the adjacent transverse edge of the carrying plate in its withdrawn position and the longitudinal portions of the sealing members extend away from the said adjacent edge of the carrying plate.

12. In a package wrapping machine as set forth in claim 10, in which the top member of the heat sealing means is mounted for vertical reciprocation and is synchronously connected with the longitudinally reciprocated carrying plate.

13. A package wrapping machine in which the package wrapping material is in the form of a continuous sheet folded upon itself lengthwise of the machine and mounted at one end of the machine for feeding the material lengthwise therethrough, the said machine comprising a table, an article carrying plate reciprocatingly mounted for longitudinal movement over the said table and projected transversely between the lower and upper layers of the folded wrapping material, a pair of heat sealing members located one above the other, means to bring the sealing members into sealing engagement with the said wrapping material firstly to seal the wrapping material transversely to form a transverse closed end, the said article carrying plate in its forward longitudinal movement contacting the transverse sealed end of the material to feed the wrapping material along the machine, means to bring the sealing members into sealing engagement with the wrapping material to secondly seal the material transversely remote from the first transverse seal and longitudinally along the edges of the material between the first and second transverse seals after the carrier plate has been withdrawn, and means to sever the second transverse seal midway of its width to separate the sealed package from the wrapping material and leave the end of the wrapping material sealed for a second operation.

References Cited in the file of this patent

UNITED STATES PATENTS

| | | |
|---|---|---|
| 2,721,017 | Hiscock | Oct. 18, 1955 |
| 2,747,346 | Tigerman et al. | May 29, 1956 |